(12) United States Patent
Smedberg et al.

(10) Patent No.: US 8,866,016 B2
(45) Date of Patent: Oct. 21, 2014

(54) CROSSLINKABLE POLYMER COMPOSITION

(75) Inventors: Annika Smedberg, Myggenas (SE); Claes Broman, Odsmal (SE)

(73) Assignee: Borealis AG, Vienna (AT)

( * ) Notice: Subject to any disclaimer, the term of this patent is extended or adjusted under 35 U.S.C. 154(b) by 726 days.

(21) Appl. No.: 13/002,859

(22) PCT Filed: Jul. 8, 2009

(86) PCT No.: PCT/EP2009/004931
§ 371 (c)(1),
(2), (4) Date: Mar. 24, 2011

(87) PCT Pub. No.: WO2010/003651
PCT Pub. Date: Jan. 14, 2010

(65) Prior Publication Data
US 2011/0180304 A1  Jul. 28, 2011

(30) Foreign Application Priority Data
Jul. 10, 2008  (EP) .................................... 08252356

(51) Int. Cl.
| *H01B 7/00* | (2006.01) |
| *B32B 27/32* | (2006.01) |
| *H01B 3/44* | (2006.01) |
| *C08L 23/08* | (2006.01) |

(52) U.S. Cl.
CPC .............. *B32B 27/32* (2013.01); *C08L 23/083* (2013.01); *C08L 2312/00* (2013.01); *H01B 3/441* (2013.01)
USPC .............. 174/110 R; 174/120 R; 174/120 SR

(58) Field of Classification Search
USPC ......... 174/36, 110 R, 120 R, 120 AR, 121 R, 174/121 SR
See application file for complete search history.

(56) References Cited

U.S. PATENT DOCUMENTS

| 4,027,080 A | * | 5/1977 | Amtmann et al. ............. 525/55 |
| 4,234,624 A | | 11/1980 | Linderoth et al. |
| 4,565,763 A | * | 1/1986 | Uchiyama et al. ......... 430/109.3 |
| 4,599,391 A | | 7/1986 | Yamamoto et al. |
| 4,694,040 A | * | 9/1987 | Hashimoto et al. ........... 524/765 |
| 4,871,819 A | | 10/1989 | Oonishi et al. |
| 4,994,539 A | | 2/1991 | Orikasa et al. |
| 5,118,763 A | * | 6/1992 | Aoki et al. .................. 525/332.8 |
| 5,480,942 A | * | 1/1996 | Addeo et al. .................. 525/194 |
| 6,063,898 A | * | 5/2000 | Endo et al. .................... 528/411 |
| 6,967,229 B2 | * | 11/2005 | Voorheis ....................... 525/264 |

(Continued)

FOREIGN PATENT DOCUMENTS

| DE | 108546 | 9/1974 |
| EP | 0463402 | 1/1992 |

(Continued)

OTHER PUBLICATIONS

International Search Report dated Nov. 12, 2009 for international application No. PCT/EP2009/004931.

(Continued)

*Primary Examiner* — William H Mayo, III
(74) *Attorney, Agent, or Firm* — Gardner Groff Greenwald & Villanueva, P.C.

(57) ABSTRACT

A Polymer Composition comprising at least one unsaturated polymer, and optionally a crosslinking agent.

18 Claims, 2 Drawing Sheets

(56) References Cited

U.S. PATENT DOCUMENTS

| | | |
|---|---|---|
| 7,468,408 B2 * | 12/2008 | Onishi et al. .................... 524/88 |
| 8,247,696 B2 * | 8/2012 | Smedberg et al. ........ 174/120 R |
| 2006/0029811 A1 * | 2/2006 | Sugioka et al. ............... 428/413 |
| 2011/0162869 A1 | 7/2011 | Smedberg et al. |
| 2011/0168427 A1 | 7/2011 | Smedberg et al. |

FOREIGN PATENT DOCUMENTS

| | | | |
|---|---|---|---|
| EP | 0928797 | 7/1999 | |
| EP | 1695996 A1 * | 8/2006 | ............. C08L 23/02 |
| EP | 1731564 A1 * | 12/2006 | ............. C08L 23/02 |
| WO | 9308222 | 4/1993 | |
| WO | 9413707 | 6/1994 | |
| WO | 9523829 | 9/1995 | |
| WO | 96/35732 | 11/1996 | |
| WO | 03000740 | 1/2003 | |
| WO | 2006131266 | 12/2006 | |
| WO | WO2006/131266 * | 12/2006 | ............. C08L 23/02 |
| WO | 2010003649 | 1/2010 | |
| WO | 2010003651 | 1/2010 | |

OTHER PUBLICATIONS

International Search Report dated Nov. 12, 2009 for international application No. PCT/EP2009/004929.
International Search Report dated Oct. 15, 2009 for international application No. PCT/US09/004930.

* cited by examiner

CROSSLINKABLE POLYMER COMPOSITION

IN THE CROSS-REFERENCE TO RELATED APPLICATIONS

This application claims priority to European Application No. 08252356.4 filed Jul. 10, 2008, which is hereby incorporated herein by reference in its entirety for all purposes.

BACKGROUND OF THE INVENTION

1. Field of Invention

The invention relates to a polymer composition which is crosslinkable and suitable for crosslinked polymer applications. Furthermore the invention relates to a crosslinkable or subsequently crosslinked article, which is preferably a cable or wire, comprising said polymer composition and to a process for preparing said crosslinkable article, preferably said crosslinkable cable or wire, as well as to a subsequent crosslinking step of said crosslinkable article, preferably said crosslinkable cable or wire.

2. Description of the Related Art

Crosslinking of polymers, e.g. polyolefins, substantially contributes to an improved heat and deformation resistance, creep properties, mechanical strength, chemical resistance and abrasion resistance of a polymer. Therefore crosslinked polymers are widely used in different end applications, such as wire and cable (W&C) applications.

Electric cables and wires are generally composed of one or more polymer layers extruded around an electric conductor. In medium (between 6 kV to 36 kV) and high voltage (higher than 36 kV) power cables, the electric conductor is usually coated first with an inner semi-conducting layer, followed by an insulating layer and an outer semi-conducting layer. To these layers, further layer(s) may be added, such as screen(s) or auxiliary barrier layer(s), e.g. one or more water barrier layer(s) and one or more jacketing layer(s).

Due to above mentioned benefits achievable with crosslinking the insulating and semi-conducting layers in a cable are typically made using a crosslinkable polymer composition. The polymer composition in the formed layered cable is then crosslinked.

Common polymeric materials for wire and cable applications comprise ethylene homo- and/or copolymers (PE) and propylene homo- and/or copolymers (PP). Crosslinkable low density polyethylene (LDPE) is today one of the predominant cable insulating materials for power cables.

Crosslinking can be effected with crosslinking agents which decompose generating free radicals. Such crosslinking agents, like peroxides, are conventionally added to the polymeric material prior to or during extrusion of the cable. Said crosslinking agent should preferably remain stable during extrusion step performed at a temperature low enough to minimize the early decomposition of the crosslinking agent, but high enough to obtain proper melting and homogenisation. If a significant amount of crosslinking agent, e.g. peroxide, already decomposes in the extruder, thereby initiating premature crosslinking, this will result in the formation of so-called "scorch", i.e. inhomogeneity, surface unevenness and possibly discolouration in the different layers of the resultant cable. Therefore, any significant decomposition of free radical forming agents during extrusion should be avoided and the crosslinking agent should decompose merely in a subsequent crosslinking step at elevated temperature. The elevated temperature increases the decomposition of the crosslinking agent and thus increases both crosslinking speed and crosslinking efficiency.

Moreover, to enable cable producers to have a high productivity in cable production lines the melt temperature of the insulation material is of importance. A slight increase in the melt temperature leads to a significant reduction in process running time and also increases the risk of scorch formation. The melt temperature can be reduced by increasing melt flow rate (MFR) of the polymer material. At the same time the flowability of the material increases which contributes to an improved processability and higher extrusion speed. A polymer with increased MFR (i.e. less viscose with lower viscosity value) would enable to increase the out put, to reduce melt pressure or to reduce melt temperature, in any combination thereof, if desired. All these parameters would also have a positive impact on the scorch performance of the material.

However, too flowable polymer layer material with high MFR will result in a non-centric cable which is not acceptable. This so called sagging brings in practice a limitation to a usable MFR of a polymer layer material, particularly in case of insulation layers.

Also the used cable production line brings limitations to the usable MFR of a polymer layer material. To avoid the undesirable sagging problem in horizontal (for example the MDCV line) and catenary continuous vulcanization (CV) lines (especially for thicker constructions) for producing a cable, it is typically required to use polymer materials, particularly for an insulation layer, which have lower MFR compared to MFR of polymer layer materials used in vertical cable production CV line and catenary continuous vulcanization (for thinner constructions). All the three cable production line types are well known in the field and described in the literature.

In a horizontal system the conductor can sink in the insulation resulting in an eccentricity of the cable core.

In a catenary CV line when the wall thickness becomes too large as the soft molten polymer mass can drop of the conductor and result in a downward displacement of the insulation layer (a so called pear shaped cable core).

Normally these types of sagging can be counteracted by:
the use of insulation compounds of lower MFR (e.g. a more viscous material)
use of eccentric tools in the head to compensate for the effect of sinking
twisting of the cable core so that displacement of the conductor not only takes place in one direction
To counteract the second type of sagging also a double rotating technique can be used
Use of so-called entry heat treatment (EHT).

BRIEF SUMMARY OF THE INVENTION

An object of the invention is to provide an alternative polymer composition which overcomes the above drawbacks, i.e. provides excellent processability properties, including flowability, without causing or increasing sagging problems.

Another object of the invention is to provide a crosslinkable cable which is optionally subsequently crosslinked and which comprises one or more layers comprising the polymer composition of the invention, which cable has i.a. good mechanical properties and good dimensional stability and can be produced with improved processing conditions or with high out put rates, or both. Moreover, a preparation process for preparing said crosslinkable cable which can be crosslinked in a subsequent crosslinking step is provided.

The term "cable" means herein a cable or a wire. The invention and further objects and preferable embodiments and subgroups thereof are further described below.

DETAILED DESCRIPTION OF THE INVENTION

Figure 1:
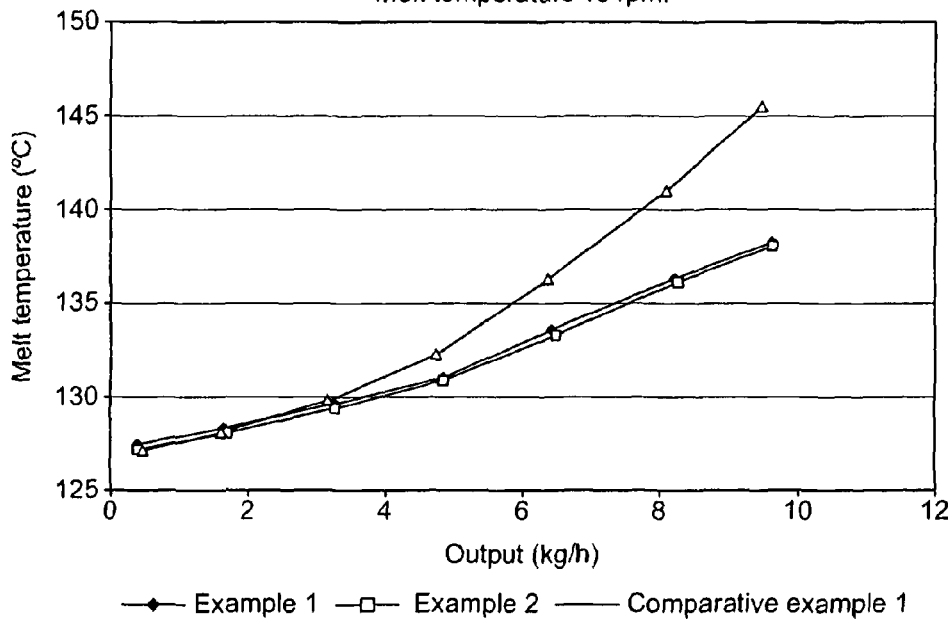
FIGS. 1 and 2 show the effect of the inventive examples 1 and 2 on melt temperature vs rpm and, respectively, vs out put compared to reference example 1.

As to the first object, the invention is directed to a polymer composition comprising
A) at least one unsaturated polymer, and
B) optionally a crosslinking agent.
wherein
the polymer composition has
a) a melt flow rate, $MFR_2$, of at least 2.3 g/10 min, and the polymer composition contains
b) carbon-carbon double bonds in an amount of at least 0.40 carbon-carbon double bonds/1000 carbon atoms.

The Polymer Composition means the polymer composition of the invention. The above b) "amount of C—C double bonds" means the "total amount of C—C double bonds present in the Polymer Composition". It is evident that at least the unsaturated polymer (A) contains said C—C double bonds which contribute to the total amount of C—C double bonds. The Polymer Composition may optionally comprise further component(s) containing said C—C double bonds which then also contribute to the total amount of said C—C double bonds. In the first embodiment therefore, the C—C double bond content is thus measured on the composition as a whole not just on the unsaturated polymer component (A) thereof.

The b) the carbon-carbon double bonds of the Polymer Composition include, preferably originate from, vinyl groups, vinylidene groups or trans-vinylene groups, or from a mixture thereof, which are present in said Polymer Composition. The Polymer Composition does not necessarily contain all types of double bonds mentioned above. However, if so, they all contribute to the "b) total amount of carbon-carbon double bonds" as defined above or below. The determination method for calculating the amounts of the above carbon-carbon bonds in the above and below definitions is described under "Determination Methods".

The $MFR_2$ is determined according to ISO 1133 under 2.16 kg load. The determination temperature is chosen, as well known, depending on the type of the unsaturated polymer used in the Polymer Composition. If the Polymer Composition contains e.g. ethylene based (co)polymer(s) (C2-content at least 50 wt %), i.e. homopolymer of ethylene or a copolymer of ethylene with one or more comonomers, or any blend of ethylene based (co)polymers, then the $MFR_2$ is determined at 190° C. Similarly, e.g. in case of propylene based (co)polymer(s) (C3-content at least 50 wt %) the $MFR_2$ is determined at 230° C. Moreover, in this invention in case of a blend of two or more different types of polymers, the $MFR_2$ and the amount of double bonds is measured from A) the unsaturated polymer of the Polymer Composition. The $MFR_2$ determination is made in the absence of a crosslinking agent.

It has been surprisingly found that a combination of MFR and the amount of C—C double bonds in the Polymer Composition as defined above or claims is highly advantageous for producing crosslinkable articles, preferably a cable. Namely, with said property combination of the invention the MFR of the polymer composition can be increased to achieve excellent processability such as extrudability, while not increasing undesirable sagging in the formed article, so that as a result an article with high quality and rigidity can be obtained, which meets e.g. the high demands required in W&C applications. It was surprising that the sagging phenomenon can be balanced with enhanced crosslinking reactivity and efficiency via increasing the amount of C—C double bonds in a less viscose polymer composition without increasing the risk for causing premature crosslinking, i.e. scorch formation, when e.g. free radicals forming crosslinking agents, such as peroxides, are present during the preparation of the article.

Moreover, the high MFR of the Polymer Composition preferably reduces the melt temperature of the Polymer Composition which together with good flowability and reduced melt pressure further contributes to the production out put and/or favourable processing conditions, if desired. All these benefits also reduce the premature crosslinking, i.e. scorch formation, e.g. in peroxide based crosslinking applications. Due to the advantageous combination also the productivity can be increased, if desired, due to longer running times due to lower risk for scorch or higher out put or improved crosslinking speed and efficiency and any combination thereof. Moreover, the invention enables, if desired, to decrease the amount of crosslinking agent, while still keeping the dimensional stability in the formed article.

The below defined preferable subgroups of the above properties, further features, such as further properties or ranges thereof, and preferable embodiments apply generally to said Polymer Composition, to end applications and to any processes thereof, and can be combined in any combination.

Polymer Composition

The Polymer Composition contains preferably b) carbon-carbon double bonds in an amount of at least 0.6/1000 carbon atoms, or preferably at least 0.8/1000 carbon atoms. The upper limit of the amount of carbon-carbon double bonds present in the Polymer Composition is not limited and may preferably be of less than 5.0/1000 carbon atoms, preferably of less than 3.0/1000 carbon atoms, or more preferably of less than 2.5/1000 carbon atoms.

The Polymer Composition comprises preferably at least vinyl groups as b) said carbon-carbon double bonds, which vinyl groups originate preferably from
i) a polyunsaturated comonomer,
ii) a chain transfer agent,
iii) an unsaturated low molecular weight compound which is e.g. a compound known as a crosslinking booster or as a scorch retarder, or
iv) any mixture of (i) to (iii).

In general, "vinyl group" means herein $CH_2$=CH— moiety which can be present in any of i) to iv) above.

The i) polyunsaturated comonomers and ii) chain transfer agents will be described below in relation to the unsaturated polymer (A) of the Polymer Composition. The iii) low molecular weight compound, if present, is added into the Polymer Composition. The iii) low molecular weight compound can be preferably a crosslinking booster which is a compound containing at least 1, preferably at least 2, unsaturated groups, such as an aliphatic or aromatic compound, an ester, an ether, or a ketone, which contains at least 1, preferably at least 2, unsaturated group(s), such as a cyanurate, an isocyanurate, a phosphate, an ortho formate, an aliphatic or aromatic ether, or an allyl ester of benzene tricarboxylic acid. Examples of esters, ethers and ketones are compounds selected from general groups of diacrylates, triacrylates, tetraacrylates, triallylcyanurate, triallylisocyanurate, 3,9-divinyl-2,4,8,10-tetra-oxaspiro[5,5]-undecane (DVS) or triallyl trimellitate (TATM) or any mixtures thereof. The crosslinking booster can be added in an amount of such crosslinking less than 2.0 wt %, preferably of less than 1.5 wt %, more preferably of less than 1.0 wt %, and the lower limit thereof is typically at least 0.05 wt %, preferably of at least 0.1 wt %, based on the weight of the polymer composition.

The so called scorch retarders (SR) (further described below) as said iii) low molecular weight component can also contribute to the total amount of C—C double bonds in the polymer composition. As such SR examples are unsaturated dimers of aromatic alpha-methyl alkenyl monomers, such as 2,4-di-phenyl-4-methyl-1-pentene, substituted or unsubstituted diphenylethylene, quinone derivatives, hydroquinone derivatives, monofunctional vinyl containing esters and ethers, monocyclic hydrocarbons having at least two or more double bonds, or mixtures thereof. More preferably, the scorch retarder is selected from 2,4-diphenyl-4-methyl-1-pentene, substituted or unsubstituted diphenylethylene, or mixtures thereof. Preferably, the amount of scorch retarder is within the range of 0.005 to 2.0 wt.-%, more preferably within the range of 0.005 to 1.5 wt.-%, based on the weight of the Polymer Composition. Further preferred ranges are e.g. from 0.01 to 0.8 wt %, 0.03 to 0.75 wt %, 0.03 to 0.70 wt %, or 0.04 to 0.60 wt %, based on the weight of the Polymer Composition.

In one preferable embodiment, b) the C—C double bonds present in the Polymer Composition include vinyl groups and the total amount of said vinyl groups is, in the given preference order, of at least 0.3/1000 carbon atoms, at least 0.35/1000 carbon atoms, at least 0.4/1000 carbon atoms, at least 0.5/1000 carbon atoms, at least 0.6/1000 carbon atoms, or of at least 0.7/1000 carbon atoms. The upper limit of the total amount of the vinyl groups present in the Polymer Composition is typically, in the given preference order, of up to 3.0/1000 carbon atoms, up to 2.5/1000 carbon atoms, or of up to 2.0/1000 carbon atoms. Accordingly, the total amount the vinyl groups, if present, contributes to the total amount of C—C double bonds present in the Polymer Composition. The total amount of vinyl groups can e.g. consist of any the above mentioned vinyl groups (i) to (iv), or, if more than one such vinyl groups (i) to (iv) are present in the Polymer Composition, then the total amount of vinyl groups it is the sum of the amounts of such more than one vinyl groups (i) to (iv).

Preferably the unsaturated polymer (A) of the Polymer Composition is a copolymer of monomer units with units of at least one unsaturated comonomer(s) and optionally of one or more other comonomer(s) and comprises at least vinyl groups which originate from the polyunsaturated comonomer.

In a further preferable embodiment the a) $MFR_2$ of the Polymer Composition is in given preference order, of at least 2.5 g/10 min, of at least 2.8 g/10 min, of at least 3.0 g/10 min, or of at least 3.2 g/10 min, when determined according to ISO 1133, under 2.16 kg load. The upper limit of $MFR_2$ of the Polymer Composition is not limited, but may be, in the given preference order, e.g. of up to 20 g/10 min, or up to 15 g/10 min, or, depending on application, up to 10 g/10 min, may even be desired, e.g. for an insulation material of a cable without limiting thereto.

The Polymer Composition may have a viscosity $\eta_0$, in the given preference order, of at least 3500 Pas, of at least 4000 Pas, of at least 5000 Pas. Preferably the Polymer Composition has a viscosity $\eta_0$, in the given preference order, of at least 3500 Pas, of at least 5000 Pas. The upper limit of said viscosity $\eta_0$ may typically be, in the given preference order, of 50 000 Pas or less, of 45 000 Pas or less, or of 40 000 Pas or less.

The Polymer Composition may have a viscosity $\eta_{0.05}$, in the given preference order, of at least 3000 Pas, of at least 3500 Pas, or of at least 4000 Pas. The upper limit of said viscosity $\eta_{0.05}$ may typically be, in the given preference order, of 40 000 Pas or less of 35 000 Pas or less, or of 30 000 Pas or less.

The Polymer Composition may have a viscosity $\eta_{300}$, in the given preference order, of 600 Pas or less, or of 500 Pas or less. The lower limit of said viscosity $\eta_{300}$ may typically be, in the given preference order, of at least 50 Pas, or of at least 100 Pas.

The Polymer Composition has preferably an $MFR_2$ as defined above or at least one of the given viscosities, preferably all, as defined above, more preferably an $MFR_2$ as defined above and at least one, preferably all, of the given viscosities as defined above.

The Polymer Composition is preferably crosslinkable and is highly suitable for producing crosslinkable articles, preferably one or more crosslinkable layers of a cable, which are subsequently crosslinked.

"Crosslinkable" is a well known expression and means that the Polyolefin Composition can be crosslinked, e.g. via radical formation, to form bridges i.a. amongst the polymer chains.

The B) crosslinking agent is defined herein to be any compound capable to generate radicals which can initiate a crosslinking reaction. Preferably, B) the crosslinking agent contains —O—O— bond or —N=N-bond. More preferably, B) the crosslinking agent is a peroxide.

Preferably, B) the crosslinking agent, which is preferably a peroxide, is present in an amount of less than 10 wt %, less than 6 wt %, more preferably of less than 5 wt %, less than 3.5 wt %, even more preferably from 0.1 wt % to 3 wt %, and most preferably from 0.2 wt % to 2.6 wt %, based on the total weight of the Polymer Composition.

Non-limiting examples of B) the crosslinking agents are organic peroxides, such as di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof. Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. Most preferably, the peroxide is dicumylperoxide.

The Polymer Composition preferably contains B) crosslinking agent.

The Polymer Composition may contain also further additive(s). Such further additive(s) include:

The above mentioned crosslinking booster(s) including the given specific compound(s), which can contribute to the crosslinking efficiency and/or to the total amount of C—C double bonds.

Preferably one or more scorch retarders (SR) which are defined herein to be compounds that reduce the formation of scorch during extrusion of a polymer composition, at typical extrusion temperatures used, if compared to the same polymer composition extruded without said compound. As mentioned above scorch retardants can also contribute to the total amount of C—C double bonds in the polymer composition. Preferred SR's and the usable amounts of SR are as given above.

Further additive(s), such as antioxidant(s), stabiliser(s), and/or processing aid(s). As an antioxidant, sterically hindered or semi-hindered phenol(s), aromatic amine(s), aliphatic sterically hindered amine(s), organic phosphate(s), thio compound(s), and mixtures thereof, can be mentioned. As further additive(s), flame retardant additive(s), water tree retardant additive(s), acid scavenger(s), inorganic filler(s) and voltage stabilizer(s) can be mentioned.

The Polymer Composition may additionally comprise further polymer component(s) including further unsaturated polymer(s) (A) which are different from the at least one unsaturated polymer (A), and polymer(s) that are not unsaturated.

The Polymer Composition can be provided in the form of a powder or pellets in any shape and size including granules. Pellets can be produced, e.g. after polymerisation of the unsaturated polymer (A), in a well known manner using the conventional pelletising equipment, such as a pelletising extruder. Preferably, the Polymer Composition is provided in the form of pellets.

The Unsaturated Polymer (A) of Polymer Composition

In a preferred embodiment of the Polymer Composition, the at least one unsaturated polymer (A) has
a) a melt flow rate, $MFR_2$, of at least 2.3 g/10 min, and said unsaturated polymer (A) contains
b) carbon-carbon double bonds in an amount of at least 0.40 carbon-carbon double bonds/1000 carbon atoms.

The b) "amount of C—C double bonds" means in this embodiment the "total amount of C—C double bonds present in the unsaturated polymer (A)". The "at least one unsaturated polymer (A)" (referred also as "the unsaturated polymer (A)") means herein both homopolymer, wherein the unsaturation is provided by a chain transfer agent, and a copolymer, wherein the unsaturation is provided by polymerizing a monomer together with at least a polyunsaturated comonomer and optionally in the presence of a chain transfer agent.

The unsaturated polymer (A) contains preferably b) carbon-carbon double bonds in an amount of at least 0.6/1000 carbon atoms, or preferably of at least 0.8/1000 carbon atoms. The upper limit of b) the amount of said carbon-carbon double bonds present in the A) unsaturated polymer is not limited and may preferably be of less than 5.0/1000 carbon atoms, preferably of less than 3.0/1000 carbon atoms, more preferably of less than 2.5/1000 carbon atoms.

Preferably, b) said carbon-carbon double bonds present in the unsaturated polymer (A) include vinyl groups, which vinyl groups originate preferably from i) a polyunsaturated comonomer, from ii) a chain transfer agent, or from iii) any mixture thereof.

More preferably, b) said C—C double bonds present in the unsaturated polymer (A) include said vinyl groups in a total amount, in the given preference order, of at least 0.3/1000 carbon atoms, at least 0.35/1000 carbon atoms, at least 0.4/1000 carbon atoms, at least 0.5/1000 carbon atoms, at least 0.6/1000 carbon atoms, or of at least 0.7/1000 carbon atoms. The upper limit of the total amount of said vinyl groups present in the unsaturated polymer (A) is not limited and may be, in the given preference order, of less than 3.0/1000 carbon atoms, less than 2.5/1000 carbon atoms, or of less than 2.0/1000 carbon atoms.

In one preferred embodiment the unsaturated polymer (A) is an unsaturated copolymer which, as already mentioned above, contains one or more unsaturated comonomer(s).

More preferably, b) said C—C double bonds present in the unsaturated copolymer include vinyl groups which originate from said polyunsaturated comonomer. Preferably, the total amount of said vinyl groups which originate from the polyunsaturated comonomer is, in the given preference order, of at least 0.20/1000 carbon atoms, at least 0.25/1000 carbon atoms, at least 0.30/1000 carbon atoms, or at least 0.35/1000 carbon atoms.

The upper limit of the amount of said vinyl groups which originate from the polyunsaturated comonomer and contribute to b) the total amount of said C—C double bonds present in the unsaturated copolymer is not limited and may be, in the given preference order, of less than 3.0/1000 carbon atoms, less than 2.5/1000 carbon atoms, less than 2.0/1000 carbon atoms, less than 1.5/1000 carbon atoms.

When the unsaturated polymer (A) of the Polymer Composition, is an unsaturated copolymer containing at least one polyunsaturated comonomer, then the polyunsaturated comonomer is straight carbon chain with at least 8 carbon atoms and at least 4 carbon atoms between the non-conjugated double bonds, of which at least one is terminal.

As to suitable unsaturated polymer materials for the Polymer Composition, said unsaturated polymer (A) can be any unsaturated polymer, preferably any unsaturated polymer having an MFR and a double bond content as defined above for the unsaturated polymer (A) of the preferable Polymer Composition. The unsaturated polymer (A) is preferably a polyolefin which means both homopolymer of olefin and copolymer of olefin with one or more comonomer(s). Said unsaturated polyolefin is preferably an unsaturated polyethylene or polypropylene. The unsaturated polyolefin can be unimodal or multimodal with respect to molecular weight distribution and/or comonomer distribution, which expressions have a well known meaning.

In the preferred embodiment of the Polymer Composition, said unsaturated polyolefin is an unsaturated copolymer of olefin with at least one polyunsaturated comonomer and optionally with one or more other comonomer(s).

Said unsaturated copolymer of olefin is preferably an unsaturated copolymer of ethylene or an unsaturated copolymer of propylene.

Where said unsaturated copolymer of olefin is a polypropylene (PP) copolymer with at least one polyunsaturated comonomer and optionally with further comonomer, it can be a random copolymer of propylene or a heterophasic propylene copolymer, which have an unsaturation in a manner known in the art. The unsaturated propylene copolymer is preferably produced by a conventional low pressure polymerization which is well documented and described in the polymer literature.

In the most preferable embodiment of the Polymer Composition the unsaturated copolymer of olefin is an unsaturated copolymer of ethylene.

Said copolymer of ethylene may be a low density polyethylene (LDPE) copolymer produced in a high pressure polymerisation process, wherein ethylene is copolymerised with at least one polyunsaturated comonomer and optionally with one or more other comonomer(s), optionally in the presence of a chain transfer agent; or it may be a linear low density polyethylene (LLDPE) produced in a low pressure process, wherein ethylene is copolymerised with at least one polyunsaturated comonomer and optionally with one or more other comonomer(s) in the presence of a coordination catalyst, such as chromium, Ziegler-Natta or single site catalyst. Both LDPE copolymers and LLDPE copolymers and the polymerisation processes thereof are well known.

As well known "Comonomer" refers to copolymerisable comonomer units.

The optional further comonomer(s) present in A) the unsaturated copolymer, preferably copolymer of ethylene, is different from the "backbone" monomer and may be selected from an ethylene and higher alpha-olefin(s), preferably $C_3$-$C_{20}$alpha-olefin(s), such as propylene, 1-butene, 1-hexene, 1-nonene or 1-octene, as well as from polar comonomer(s).

It is well known that e.g. propylene can be used as a comonomer or as ii) a chain transfer agent (CTA), or both, whereby it can contribute to b) the total amount of the C—C double bonds, preferably to the total amount of the vinyl groups. Herein, when copolymerisable CTA, such as propylene, is used, the copolymerised CTA is not calculated to the comonomer content.

In a preferred embodiment of the Polymer Composition, the unsaturated polymer (A) is an unsaturated LDPE polymer and more preferably an unsaturated LDPE copolymer containing at least one comonomer which is a polyunsaturated comonomer (referred below as LDPE copolymer).

More preferably, said polyunsaturated comonomer is a diene, preferably 1) a diene which comprises at least 8 carbon atoms, the first carbon-carbon double bond being terminal and the second carbon-carbon double bond being non-conjugated to the first one (group 1 dienes). Preferred dienes (1) are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, 1) the diene is selected from 1,7-octadiene, 1,9-decadiene, 1,11-dodecadiene, 1,13-tetradecadiene, or any mixture thereof.

In addition or as an alternative to the dienes (1) listed above, 2) the diene may also be selected from other types of polyunsaturated dienes, such as from one or more siloxane compounds having the following formula (group 2 dienes):

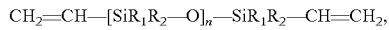

$$CH_2=CH-[SiR_1R_2-O]_n-SiR_1R_2-CH=CH_2,$$

wherein n=1 to 200, and $R_1$ and $R_2$, which can be the same or different, are selected from $C_1$ to $C_4$ alkyl groups and/or $C_1$ to $C_4$ alkoxy groups.

Preferably, $R_1$ and/or $R_2$ are methyl, methoxy or ethoxy. Preferably, n=1 to 100, more preferably 1 to 50. As an example, divinylsiloxanes such as α,ω-divinylsiloxane can be mentioned.

Preferred polyunsaturated comonomers for A) said unsaturated copolymer are the dienes from group 1) as defined above. The unsaturated copolymer is more preferably a copolymer of ethylene with at least one diene selected from 1,7-octadiene, 1,9-decadiene, 1,11-dodecadiene, 1,13-tetradecadiene, or any mixture thereof, and optionally with one or more other comonomer(s). It is also preferred that said unsaturated copolymer is the above-mentioned unsaturated LDPE copolymer. It may contain further comonomers, e.g. polar comonomer(s), alpha-olefin comonomer(s), or any mixture thereof.

As a polar comonomer, compound(s) containing hydroxyl group(s), alkoxy group(s), carbonyl group(s), carboxyl group(s), ether group(s) or ester group(s), or a mixture thereof can used. More preferably, compounds containing carboxyl and/or ester group(s) are used and still more preferably, the compound is selected from the groups of acrylate(s), methacrylate(s) or acetate(s), or any mixtures thereof.

If present in said unsaturated LDPE copolymer, the polar comonomer is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said polar copolymer comprises a copolymer of ethylene with $C_1$- to $C_4$-alkyl acrylate, such as methyl, ethyl, propyl or butyl acrylate, or vinyl acetate, or any mixture thereof.

The unsaturated polymer (A) of the Polymer Composition of invention can be prepared using i.a. any conventional polymerisation process and equipment, the conventional means as described above for providing unsaturation and any conventional means for adjusting the MFR, in order to control and adjust the process conditions to achieve the desired inventive balance between MFR and C—C double bond content of the polymerised polymer, which balance can be further tailored depending on the desired embodiment. The unsaturated LDPE polymer as defined above, preferably the unsaturated LDPE copolymer, of the Polymer Composition is preferably produced in high pressure reactor by free radical initiated polymerisation (referred to as high pressure radical polymerization). The usable high pressure (HP) polymerisation and the adjustment of process conditions are well known and described in the literature, and can readily be used by a skilled person to provide the above inventive balance. High pressure polymerisation can be effected in a tubular reactor or an autoclave reactor, preferably in a tubular reactor. One preferable HP process is described below for polymerising ethylene optionally together with one or more comonomer(s), preferably at least with one or more polyunsaturated comonomer(s), in a tubular reactor to obtain a LDPE homopolymer or copolymer as defined above. The process can be adapted to other polymers as well:

Compression:

Ethylene is fed to a compressor mainly to enable handling of high amounts of ethylene at controlled temperature. The compressors are usually a piston compressor or diaphragm compressors. The compressor is usually a series of compressors that can work in series or in parallel. Most common is 2-5 compression steps. Recycled ethylene and comonomers can be added at feasible points depending on the pressure. Temperature is typically low, usually in the range of less than 200° C. or less than 100° C. Said temperature is preferably less than 200° C.

Tubular Reactor:

The mixture is fed to the tube reactor. First part of the tube is to adjust the temperature of the feed ethylene; usual temperature is 150-170° C. Then the radical initiator is added. As the radical initiator, any compound or a mixture thereof that decomposes to radicals at a elevated temperature can be used. Usable radical initiators are commercially available. The polymerization reaction is exothermic. There can be several radical initiator injections points, e.g. 1-5 points, usually provided with separate injection pumps. Also ethylene and optional comonomer(s) can be added at any time during the process, at any zone of the tubular reactor and/or from one or more injection points, as well known. The reactor is continuously cooled e.g. by water or steam. The highest temperature is called peak temperature and the lowest temperature is called radical initiator temperature. The "lowest temperature" means herein the reaction starting temperature which is called the initiation temperature which is "lower" as evident to a skilled person.

Suitable temperatures range from 80 to 350° C. and pressure from 100 to 400 MPa. Pressure can be measured at least in compression stage and after the tube. Temperature can measured at several points during all steps. High temperature and high pressure generally increase output. Using various temperature profiles selected by a person skilled in the art will allow control of structure of polymer chain, i.e. Long Chain Branching and/or Short Chain branching, density, branching factor, distribution of comonomers, MFR, viscosity, Molecular Weight Distribution etc.

The reactor ends conventionally with a valve. The valve regulates reactor pressure and depressurizes the reaction mixture from reaction pressure to separation pressure.

Separation:

The pressure is typically reduced to approx 10 to 45 MPa, preferably to approx 30 to 45 MPa. The polymer is separated from the unreacted products, for instance gaseous products, such as monomer or the optional comonomer, and most of the unreacted products are recovered. Normally low molecular compounds, i.e. wax, are removed from the gas. The pressure can further be lowered to recover and recycle the unused gaseous products, such as ethylene. The gas is usually cooled and cleaned before recycling.

Then the obtained polymer melt is normally mixed and pelletized. Optionally, or in some embodiments preferably, additives can be added in the mixer. Further details of the production of ethylene (co)polymers by high pressure radical polymerization can be found in the Encyclopedia of Polymer Science and Engineering, Vol. 6 (1986), pp 383-410.

The MFR of the unsaturated LDPE polymer (A), preferably unsaturated LDPE copolymer, can be adjusted by using e.g. chain transfer agent during the polymerisation, or by adjusting reaction temperature or pressure. When the unsaturated LDPE copolymer of the invention is prepared, then, as well known, the C—C double bond content can be adjusted by polymerising the ethylene e.g. in the presence of one or more polyunsaturated comonomer(s), chain transfer agent(s), or both, using the desired feed ratio between C2 and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers, such as an α,ω-alkadienes, to increase the unsaturation of an ethylene copolymer. The nonreacted double bond(s) thus provides pendant vinyl groups to the formed polymer chain at the site, where the polyunsaturated comonomer was incorporated by polymerization. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes. Moreover, as known, e.g. propylene can be used as a chain transfer agent to provide said double bonds, whereby it can also partly be copolymerised with ethylene.

The alternative unsaturated LDPE homopolymer may be produced analogously to above described process conditions as the unsaturated LDPE copolymer, except that ethylene is polymerised in the presence of a chain transfer agent only.

In a further preferable embodiment the a) $MFR_2$ of the unsaturated polymer (A), preferably of the unsaturated LDPE copolymer, is, in given preference order, of at least 2.5 g/10 min, of at least 2.8 g/10 min, or of at least 3.0 g/10 min, when determined according to ISO 1133, under 2.16 kg load, at 190° C. The upper limit of $MFR_2$ of the unsaturated polymer (A), preferably of the unsaturated LDPE copolymer, is not limited, but may be, in the given preference order, e.g. of up to 20 g/10 min, or up to 15 g/10 min, or, depending on application, up to 10 g/10 min or up to 8 g/10 min, may even be desired, e.g. for an insulation material of a cable without limiting thereto.

The unsaturated polymer (A), preferably the unsaturated LDPE copolymer, may have a viscosity $\eta_0$, in the given preference order, of at least 3500 Pas, of at least 5000 Pas, or of at least 6500 Pas. The upper limit of said viscosity $\eta_0$ may typically be, in the given preference order, of 50 000 Pas or less, of 45 000 Pas or less, of 40 000 Pas or less, of 38 000 Pas or less, of 36 500 Pas or less, or of 35 000 Pas or less. Preferably said upper limit of the viscosity $\eta_0$ may typically be, in the given preference order, of 45 000 Pas or less, of 40 000 Pas or less, or of 35 000 Pas or less.

The unsaturated polymer (A), preferably the unsaturated LDPE copolymer, may have a viscosity $\eta_{0.05}$, in the given preference order, of at least 3500 Pas, of at least 4000 Pas, or of at least 5000 Pas. The upper limit of said viscosity $\eta_{0.05}$ may typically be, in the given preference order, of 35 000 Pas or less, of 30 000 Pas or less, or of 25 000 Pas or less.

The unsaturated polymer (A), preferably the unsaturated LDPE copolymer, may have a viscosity $\eta_{300}$, in the given preference order, of 550 Pas or less, or of 450 Pas or less. The lower limit of said viscosity $\eta_{300}$ may typically be, in the given preference order, of at least 100 Pas, or of at least 150 Pas.

Preferably, the unsaturated polymer (A), preferably the unsaturated LDPE copolymer, has preferably an $MFR_2$ as defined above or at least one of the given viscosities, preferably all, as defined above, more preferably an $MFR_2$ as defined above and at least one, preferably all, of the given viscosities as defined above.

One preferable unsaturated polymer (A), preferably of the LDPE copolymer, of the present invention may have a density, in the given preference order, of higher than 0.860, higher than 0.880, higher than 0.900, higher than 0.910, or of higher than 0.915, g/cm$^3$.

Another preferable unsaturated polymer (A), preferably of the LDPE copolymer, of the present invention may have a density, in the given preference order, of up to 0.960 g/cm$^3$, less than 0.955, less than 0.950, less than 0.945, less than 0.940, less than 0.935, or of less than 0.930, g/cm$^3$. Most preferred range is from 0.915 to 0.930 g/cm$^3$.

Further preferably, said unsaturated copolymer, preferably the LDPE copolymer, of the Polymer Composition contains comonomer(s) in a total amount of up to 45 wt %, e.g. of from 0.05 to 25 wt.-%, or more preferably from 0.1 to 15 wt.-%, based on the amount of the unsaturated polyolefin.

The preferred A) the unsaturated polymer of the Polymer Composition is crosslinkable.

In the preferred embodiment the Polymer Composition consists of the at least one unsaturated polymer (A). The expression means that the Polymer Composition does not contain further polymer components, but the unsaturated polymer (A) as the sole polymer component. However, it is to be understood herein that the Polymer Composition may comprise further components such as above additives which may be added in a mixture with a carrier polymer, i.e. in so called master batch.

Preferably, the Polymer Composition comprises, more preferably consists of, the unsaturated polymer (A) as defined above, optionally, and preferably, together with the crosslinking agent (B), such as peroxide, and optionally together with further additive(s), and is in the form of pellets.

End Applications

It is to be understood that the above preferable subgroups and embodiments of the Polymer Composition, and of the components A) the unsaturated polymer and the optional B) crosslinking agent thereof, apply equally to the end applications as well.

The invention further provides an article, which is a crosslinkable and comprises the Polymer Composition of the invention including the preferable subgroups and embodiments thereof.

The invention is highly suitable for W&C applications, whereby the article is a cable which is crosslinkable and comprises a conductor surrounded by one or more layers, wherein at least one layer comprises the Polymer Composition comprising
A) at least one unsaturated polymer, and
B) optionally a crosslinking agent.
wherein
the Polymer Composition has
a) a melt flow rate, $MFR_2$, of at least 2.3 g/10 min, and the Polymer Composition contains
b) carbon-carbon double bonds in an amount of at least 0.40 carbon-carbon double bonds/1000 carbon atoms.

The term "conductor" means herein above and below that the conductor comprises one or more wires. Moreover, the cable may comprise one or more such conductors. Preferably the conductor is an electrical conductor.

In a preferred cable of the invention, the at least one layer comprises said Polymer Composition, wherein the at least one unsaturated polymer (A) has
a) a melt flow rate, $MFR_2$, of at least 2.3 g/10 min, and said unsaturated polymer (A) contains
b) carbon-carbon double bonds in an amount of at least 0.40 carbon-carbon double bonds/1000 carbon atoms.

Preferably the at least one layer of the cable comprising the Polymer Composition is an insulation layer.

If the Polymer Composition e.g. for cable layer applications contains a filler e.g. a carbon black, then the amount of a filler is preferably 3 wt % or less. Filler is understood herein as an additive which would decrease the MFR of the Polymer Composition, when used above the given 3 wt %, so that processability is markedly deteriorated. If an insulation layer comprises the Polymer Composition, then preferably no such filler is present in said layer.

Further preferably the cable of the invention is a power cable which comprises at least an inner semiconductive layer, an insulation layer and an outer semiconductive layer in given order, wherein at least the insulation layer comprises the Polymer Composition of the invention.

The power cable means herein a cable that transfers energy operating at any voltage. The voltage applied to the power cable can be alternating (AC), direct (DC), or transient (impulse). In a preferred embodiment, the multi-layered article is a power cable operating at voltages higher than 1 kV.

Moreover, the invention provides a process for producing the above defined article, which comprises the steps of a) forming an article comprising the Polymer Composition. Said process preferably comprises at least the steps of
$a_0$) meltmixing a Polymer Composition optionally together with further component(s), and
a) forming an article comprising the Polymer Composition.

"Meltmixing" is well known blending method, wherein the polymer component(s) are mixed in an elevated temperature, which is typically above, preferably 20-25° C. above, the melting or softening point of polymer component(s).

In a preferred embodiment a cable, which comprises a conductor surrounded by one or more layers, is produced, wherein the process comprises a step of a) applying on a conductor the Polymer Composition to form at least one of said cable layers surrounding the conductor.

Thus in step (a) the at least one layer of said one or more layers is applied using the Polymer Composition.

Also the above preferable cable production process preferably comprises at least two steps of
$a_0$) meltmixing said Polymer Composition optionally together with further component(s), and then
a) applying the meltmix obtained from step $a_0$) on a conductor to form at least one of said one or more cable layers.

The Polymer Composition may be introduced to step $a_0$) of the Process e.g. in pellet form and mixing, i.e. meltmixing, is carried out in an elevated temperature which melts (or softens) the polymer material to enable processing thereof.

Preferably, the layers are a) applied by (co)extrusion. The term "(co)extrusion" means herein that in case of two or more layers, said layers can be extruded in separate steps, or at least two or all of said layers can be coextruded in a same extrusion step, as well known in the art.

In one preferable embodiment the crosslinkable Polymer Composition may contain a crosslinking agent (B) before the polymer composition is used for cable production, whereby the unsaturated polymer (A) and the crosslinking agent (B) can be blended by any conventional mixing process, e.g. by addition of the crosslinking agent (B) to a melt of Polymer Composition, e.g. in an extruder, as well as by adsorption of liquid peroxide, peroxide in liquid form or peroxide dissolved in a solvent on a solid Polymer Composition, e.g. the pellets thereof. Alternatively in this embodiment, the unsaturated polymer (A) and the crosslinking agent (B) can be blended by any conventional mixing process. Exemplary mixing procedures include melt mixing, e.g. in an extruder, as well as adsorption of liquid peroxide, peroxide in liquid form or a peroxide dissolved in a solvent on the polymer or on the pellets thereof. The obtained Polymer Compostion of components (A) and (B) is then used for the article, preferably cable, preparation process.

In another embodiment, the crosslinking agent may be added e.g. in step $a_0$) during the preparation of the crosslinkable article. When the crosslinking agent is added during the article preparation process, then it is preferably the crosslinking agent (B) as defined above and may be added in a liquid form at ambient temperature, or is preheated above the melting or glass transition point thereof or dissolved in a carrier medium, as well known in the art.

The Polymer Composition may contain also further additive(s) or further additive(s) may be blended to the Polymer Composition during a preparation process of an article thereof.

Accordingly the process of the invention preferably comprises the steps of
$a_{00}$) providing to said step $a_0$) said Polymer Composition as defined in any of the preceding claims, which comprises
A) at least one unsaturated polymer, which is crosslinkable, and
B) a crosslinking agent(s),
$a_0$) meltmixing the Polymer Composition optionally together with further components, and
a) applying the meltmix obtained from step $a_0$) on a conductor to form at least one of said one or more cable layers.

Alternatively, the process of the invention comprises the steps of
$a_{00}$) providing to said step $a_0$) said Polymer Composition as defined in any of the preceding claims, which comprises
A) at least one unsaturated polymer, which is crosslinkable,
$a_{00'}$) adding to said Polymer Compostion at least one crosslinking agent,
$a_1$) meltmixing the Polymer Composition and the crosslinking agent, optionally together with further components, and a) applying the meltmix obtained from step $a_0$) on a conductor to form at least one of said one or more cable layers.

In the preferred Process, the $a_0$) meltmixing of the Polymer Composition alone or as a blend with optional further polymer(s) and optional additive(s) is performed in a mixer or an extruder, or in any combination thereof, at elevated temperature and, if crosslinking agent is present, then below the subsequently used crosslinking temperature. After $a_0$) meltmixing, preferably in said extruder, the resulting meltmixed layer material is then preferably a) (co)extruded on a conductor in a manner very well known in the field. Mixers and extruders, such as single or twins screw extruders, that are used conventionally for cable preparation are suitable for the process of the invention.

The preferred embodiment of the process provides the preparation of a crosslinkable cable, preferably a crosslinkable power cable, wherein the process comprises a further step of b) crosslinking the at least one cable layer obtained from step a) comprising a crosslinkable unsaturated polymer (A) of the Polymer Composition, wherein the crosslinking is effected in the presence of a crosslinking agent, which is preferably said crosslinking agent (B), more preferably a peroxide.

It is understood and well known that also the other cable layers and materials thereof, if present, can be crosslinked at the same time, if desired.

Crosslinking can be effected at crosslinking conditions, typically by treatment at increased temperature, e.g. at a temperature above 140° C., more preferably above 150° C., such as within the range of 160 to 350° C., depending on the used crosslinking agent(s) as well known in the field. Typically the crosslinking temperature is at least 20° C. higher than the temperature used in meltmixing step $a_0$) and can be estimated by a skilled person.

Preferably, crosslinking conditions are maintained until the crosslinked Polymer Composition has a hot set elongation value of 175% or less at 200° C., when measured from crosslinked plaque sample according to IEC 60811-2-1. This method is also called "hot set" and indicates the degree of crosslinking. Lower hot set value means less thermal deformation and, consequently, higher degree of crosslinking. More preferably, the hot set elongation value is 120% or less, even more preferably 100% or less. Furthermore, crosslinking conditions are preferably maintained until the crosslinked Polymer Composition of the invention has a permanent deformation of less than 15%, even more preferably of less than 10%. Hot set and permanent deformation is measured as described in the experimental part under "Determination methods".

As a result a crosslinked cable is obtained comprising at least one crosslinked layer of the Polymer Composition of the invention.

Determination Methods

Unless otherwise stated in the description or experimental part the following methods were used for the property determinations.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$). The MFR is determined at 230° C. for polypropylenes.

Density

The density was measured according to ISO 1183D. The sample preparation was executed according to ISO 1872-2.

Amount of Double Bonds in the Polymer Composition or in the Unsaturated Polymer

This method applies both for the determination of the double bonds of the Polymer Composition and for the unsaturated polymer (A). Both are referred below as a composition or a polymer, respectively.

The procedure for the determination of the amount of double bonds/1000 C-atoms is based upon the ASTM D3124-98 method. In that method, a detailed description for the determination of vinylidene groups/1000 C-atoms is given based on 2,3-dimethyl-1,3-butadiene. The described sample preparation procedure has also been applied for the determination of vinyl groups/1000 C-atoms, vinylidene groups/1000 C-atoms and trans-vinylene groups/1000 C-atoms in the present invention. However, for the determination of the extinction coefficient for these three types of double bonds, the following three compounds have been used: 1-decene for vinyl, 2-methyl-1-heptene for vinylidene and trans-4-decene for trans-vinylene, and the procedure as described in ASTM-D3124 section 9 was followed.

The total amount of double bonds was analysed by means of IR spectrometry and given as the amount of vinyl bonds, vinylidene bonds and trans-vinylene bonds per 1000 carbon atoms.

The total amount of double bonds was analysed by means of IR spectrometry and given as the amount of vinyl bonds, vinylidene bonds and trans-vinylene bonds per 1000 carbon atoms.

The composition or polymer to be analysed were pressed to thin films with a thickness of 0.5-1.0 mm. The actual thickness was measured. FT-IR analysis was performed on a Perkin Elmer 2000. Four scans were recorded with a resolution of 4 $cm^{-1}$.

A base line was drawn from 980 $cm^{-1}$ to around 840 $cm^{-1}$. The peak heights were determined at around 888 $cm^{-1}$ for vinylidene, around 910 $cm^{-1}$ for vinyl and around 965 $cm^{-1}$ for trans-vinylene. The amount of double bonds/1000 carbon atoms was calculated using the following formulas:

$$\text{vinylidene}/1000 \text{ C-atoms} = (14 \times A)/(18.24 \times L \times D)$$

$$\text{vinyl}/1000 \text{ C-atoms} = (14 \times A)/(13.13 \times L \times D)$$

$$\text{trans-vinylene}/1000 \text{ C-atoms} = (14 \times A)/(15.14 \times L \times D)$$

wherein

A: absorbance (peak height)

L: film thickness in mm

D: density of the material (g/$cm^3$)

The molar absorptivity (B), i.e. 18.24, 13.13 and, respectively, 15.14, in the above calculations was determined as $1 \cdot mol^{-1} \cdot mm^{-1}$ via:

$$B = A/(C \times L)$$

were A is the maximum absorbance defined as peak height, C the concentration ($mol \cdot l^{-1}$) and L the cell thickness (mm).

The procedure follows the standard ASTM D6248-98. At least three 0.18 $mol \cdot l^{-1}$ solutions in carbon disulphide (CS2) were used and the mean value of the molar extinction coefficient used.

The amount of vinyl groups originating from the polyunsaturated comonomer per 1000 carbon atoms was determined and calculated as follows:

The polymer to be analysed and a reference polymer have been produced on the same reactor, basically using the same conditions, i.e. similar peak temperatures, pressure and production rate, but with the only difference that the polyunsaturated comonomer is added to polymer to be analysed and not added to reference polymer. The total amount of vinyl groups of each polymer was determined by FT-IR measurements, as described above. Then, it is assumed that the base level of vinyl groups, i.e. the ones formed by the process and from chain transfer agents resulting in vinyl groups (if present), is the same for the reference polymer and the polymer to be analysed with the only exception that in the polymer to be analysed also a polyunsaturated comonomer is added to the reactor. This base level is then subtracted from the measured amount of vinyl groups in the polymer to be analysed, thereby resulting in the amount of vinyl groups/1000 C-atoms, which result from the polyunsaturated comonomer.

Calibration Procedure for Measuring the Double Bond Content of an Unsaturated Low molecular weight compound (iii), if present (referred below as Compound)

The molar absorptivity for Compound (e.g. a crosslinking booster or a scorch retarder compound as exemplified in the description part) can be determined according to ASTM D6248-98. At least three solutions of the Compound in $CS_2$ (carbon disulfide) are prepared. The used concentrations of the solutions are close to 0.18 mol/l. The solutions are analysed with FTIR and scanned with resolution 4 cm$^{-1}$ in a liquid cell with path length 0.1 mm. The maximum intensity of the absorbance peak that relates to the unsaturated moiety of the Compound(s) (each type of carbon-carbon double bonds present) is measured.

The molar absorptivity, B, in liters/molxmm for each solution and type of double bond is calculated using the following equation:

$$B=(1/CL) \times A$$

C=concentration of each type of carbon-carbon double bond to be measured, mol/l
L=cell thickness, mm
A=maximum absorbance (peak height) of the peak of each type of carbon-carbon double bond to be measured, mol/l.

The average of the molar absorptivity, B, for each type of double bond is calculated. The average molar absorptivity, B, of each type of carbon-carbon double bond can then be used for the calculation of the concentration of double bonds in the reference polymer and the polymer samples to be analysed.

Rheology, Dynamic (Viscosity, Shear Thinning Index):

Rheological parameters such as Shear Thinning Index SHI and Viscosity are determined by using a rheometer, preferably a Anton Paar Physica MCR 300 Rheometer on compression moulded samples under nitrogen atmosphere at 190° C. using 25 mm diameter plates and plate and plate geometry with a 1.5 mm gap. The oscillatory shear experiments were done within the linear viscosity range of strain at frequencies from 0.05 to 300 rad/s (ISO 6721-1). Five measurement points per decade were made.

The values of storage modulus (G'), loss modulus (G") complex modulus (G*) and complex viscosity ($\eta^*$) were obtained as a function of frequency ($\omega$). $\eta_{100}$ is used as abbreviation for the complex viscosity at the frequency of 100 rad/s. In the tests frequencies of 0.05, 0.10 and 300 rad/s were used.

Shear thinning index (SHI), which correlates with MWD and is independent of Mw, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.).

SHI value is obtained by calculating the complex viscosities at given values of complex modulus and calculating the ratio of the two viscosities. For example, using the values of complex modulus of 1 kPa and 100 kPa, then $\eta^*(1$ kPa) and $\eta^*(100$ kPa) are obtained at a constant value of complex modulus of 1 kPa and 100 kPa, respectively. The shear thinning index $SH_{1/100}$ is then defined as the ratio of the two viscosities $\eta^*(1$ kPa) and $\eta^*(100$ kPa), i.e. $\eta(1)/\eta(100)$.

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line. The $\eta_0$ value is extrapolated. For practical reasons also $\eta_{0.05}$ value can be extrapolated.

Extrusion Test

The extrusion tests as described below were performed on pellets with the different compositions (e.g base resins) with no crosslinking agent present.

The processing testing was done on a Göttfert Extrusiometer equipment.

Hardware

Göttfert Extrusiometer MP Ø=30 mm/L=20D=600 mm fitted with a single 3:1 ratio compression screw and a Ø=2 mm/L=30 mm die.

Heater Band Settings
Zone 1 (Feeding zone): 105° C.
Zone 2 (Compression zone): 110° C.
Zone 3 (1st metering zone): 120° C.
Zone 4 (2nd metering zone): 125° C.

In addition to the standard heater bands of the Göttfert Extrusiometer MP, a 35 mm wide heater band was fitted to the die housing and set to 125° C.

Extrusion Speeds

Output and temperature of the melt were measured at increasing extrusion speeds at 5, 20, 40, 60, 80, 100 and 115 rpm. For some materials, the extruder was unable to reach 115 rpm, in which case data were recorded at the maximum rpm that was possible to obtain.

Melt Temperature Measurement

The temperature of the melt was recorded by an adiabatic thermocouple placed in the centre of the flow channel, just before the inlet of the die. The value recorded at each extrusion speed was taken after the temperature had been allowed to stabilize.

Output Measurement

When the temperature was stable at each speed, output was measured by collecting the extrudate during three consecutive periods of 36 seconds each. The three samples were individually weighed. By multiplying the average of the three sample weights by a factor of 100, the output was given in g/h.

Crosslinking of Plaques and Determination of Hot Set Elongation and Permanent Deformation The pellets of inventive (Polymer Composition) and comparative polymers were used for the determination.

Hot set elongation and Permanent deformation are determined according to IEC 60811-2-1 using crosslinked plaque samples. These plaques are prepared from the test polymer pellets containing peroxide as follows: First, the pellets were melted at 120° C. at around 20 bar for 1 minute. Then the pressure was increased to 200 bar, followed by ramping the temperature up to 180° C. which takes 4 min. The material was then kept at 180° C. for 8 minutes and after that it was cooled down to room temperature at a cooling rate of 15° C./min. The thickness of the obtained crosslinked plaque was around 1.8 mm.

The hot set elongation as well as the permanent deformation were determined on dumbbell shaped specimens samples punched out from the crosslinked plaques. The samples were marked with a reference length of $L_0=20$ mm. In the hot set test, a dumbbell of the tested material is equipped with a weight corresponding to 20 N/cm$^2$. This specimen is placed in an oven at 200° C. and after 15 minutes, the distance between the reference marks is measured, e.g. the elongation $L_1$ is measured. Subsequently, the weight is removed and the sample is allowed to relax for 5 minutes. Then, the sample is taken out from the oven and is cooled down to room temperature. Then, the distance between the reference marks is measured, e.g. the so-called permanent deformation $L_2$ is determined. Reported values are average values based on three measurements.

Hot set elongation=$(L_0-L_0)/L_0$

Permanent deformation=$(L_2-L_0)/L_0$

Monsanto Scorch Test

A circular plaque was pressed at 120° C., 2 min without pressure followed by 2 min at 5 tons pressure and then the plaque was cooled to room temperature. This plaque was then analysed in a Monsanto MDR Equipment (supplier Monsanto) Equipment at the selected temperature and the increase in torque was then monitored as a function of crosslinking/heattreatment time. The torque increase data for a reference material were generated as comparison. Then the times needed to reach certain increases in torque were determined and these were then compared with the inventive formulations. The Monsanto scorch was determined at 140° C. The time presented in the examples is the time from the start of the test until a torque value of 1 dNm is reached (from the minimum torque value in the torque curve (Torque$_{min}$+1 dNm) value is referred to the Monsanto scorch value. The longer time it takes, the more resistant is the formulation to form scorch. The average value of two measurements is reported.

Elastograph Measurements of the Degree of Crosslinking

The degree of crosslinking was determined on a Göttfert Elastograph™. First a circular plaque was pressed in a bench scale press at 120° C., 2 min without pressure followed by 2 min at 5 (kPa) tons pressure from pellets containing peroxide. Then the plaque was cooled to room temperature. In the Elastograph the evolution of the torque is measured as a function of crosslinking time. The final torque value is referred to the Elastograph value. In this application a crosslinking temperature of 180° C. has been used. The average value of two measurements is reported. Also the time to reach 10% as well as 90% of the final torque value are reported as well.

These two properties are calculated according to the two equations given below:

$T10$=Min torque value+0.10(Max torque value−Min torque value)

$T90$=Min torque value+0.90(Max torque value−Min torque value).

These torque values are used to determine the reported time to reach T10 and T90 respectively.

The sagging performance was evaluated in a large scale with cable experiments where the centricity of a 30 kV type of cable was evaluated.

Cable Production for Centricity Tests

Polymers pellets containing dicumylperoxide in amounts according to the descriptions below were used. A 30 kV cable was produced on a Maillefer pilot cable line of the Catenary Continuous Vulcanisation (CCV) type. The evaluated construction had a conductor area of 50 mm$^2$, an inner semiconductive layer of 0.9 mm, an insulation layer of 8-9 mm and an outer semiconductive layer of 1 mm. The cable was produced as a 1+2 construction (e.g first the inner semiconductive layer was applied onto the conductor and then the remaining two layer were applied via the same extrusion head to the conductor having already the inner semiconductive layer applied). The cable cores were produced with a line speed of 1.4-1.6 m/min.

The centricity was determined on crosslinked 30 kV cables produced on a CCV line according to the description given above. The thickness of the insulation layer was determined at four different positions around the cable with 90° inbetween (e.g at the positions 0°, 90°, 180° and 270°) under a microscope.

Centricity is calculated as the (Max thickness−Min thickness) divided by the average thickness based on the thickness analysis in the four different positions. So Centricity=(Max thickness−Min thickness)/Average thickness Experimental Part Examples for the Patent Application The polymers are all low density polyethylenes polymerised in a high pressure reactor Inventive Example 1

Polymer 1: Poly(ethylene-co-1,7-octadiene) Polymer with 0.87 Vinyl Groups/1000 C, Density=921.0 kg/m$^3$ Ethylene was compressed in a 5-stage precompressor and a 2-stage hyper compressor with intermediate cooling to reach an initial reaction pressure of ca. 2973 bar. The total compressor throughput was ca. 30 tons/hour. In the compressor area approximately 121 kg propylene/hour was added as chain transfer agent to maintain an MFR of 3.2 g/10 min. Here also 1,7-octadiene was added to the reactor in amount of ca. 57 kg/h. The compressed mixture was heated to approximately 165° C. in a preheating section of a front feed three-zone tubular reactor with an inner diameter of ca. 40 mm and a total length of ca. 1200 meters. A mixture of commercially available peroxide radical initiators dissolved in isododecane was injected just after the preheater in an amount sufficient for the exothermal polymerization reaction to reach peak temperature of ca. 283° C. after which it was cooled to approx 225° C. The subsequent 2nd and 3rd peak reaction temperatures were ca. 283° C. and ca. 267° C., respectively, with a cooling in between down to approximately 235° C. The reaction mixture was depressurized by a kick valve, cooled and polymer was separated from unreacted gas.

Inventive Example 2

Polymer 2: Poly(ethylene-co-1,7-octadiene) Polymer with 0.77 Vinyl Groups/1000 C, Density=921.0 kg/m$^3$ Ethylene was compressed in a 5-stage precompressor and a 2-stage hyper compressor with intermediate cooling to reach an initial reaction pressure of ca. 2943 bar. The total compressor throughput was ca. 30 tons/hour. In the compressor area approximately 134 kg propylene/hour was added as chain transfer agent to maintain an MFR of 4.2 g/10 min. Here also 1,7-octadiene was added to the reactor in amount of ca. 44 kg/h. The compressed mixture was heated to approximately 165° C. in a preheating section of a front feed three-zone tubular reactor with an inner diameter of ca. 40 mm and a total length of ca. 1200 meters. A mixture of commercially available peroxide radical initiators dissolved in isododecane was injected just after the preheater in an amount sufficient for the exothermal polymerization reaction to reach peak temperature of ca. 288° C. after which it was cooled to approx 230° C. The subsequent 2nd and 3rd peak reaction temperatures were ca. 272° C. and ca. 267° C., respectively, with a cooling in between down to approximately 235° C. The reaction mixture was depressurized by a kick valve, cooled and polymer was separated from unreacted gas.

Comparative Example Polymer 3

Commercially Available LDPE, $MFR_2$=2 g/10 min. Vinyl Content=0.11 Vinyl/1000 C. Density=922 kg/m$^3$ LE4201—used for the centricity (sagging) tests performed on extruded crosslinked cables. LE4201 is a crosslinkable commercial grade supplied by Borealis. The material has a $MFR_2$=2.0 g/10 min and a density of 922 kg/m$^3$.

LE4244—used for the centricity (sagging) tests performed on extruded crosslinked cables. LE4244 is a crosslinkable commercial grade supplied by Borealis. The material has a $MFR_2$=0.8 g/10 min and a density of 922 kg/m$^3$.

Characterisation Data

| Compn | Polymer | $MFR_2$ (g/10 min) | $\eta_0$ (Pa s) | $\eta_{0.05}$ (Pa s) | $\eta_{0.10}$ (Pa s) | $\eta_{300}$ (Pa s) |
|---|---|---|---|---|---|---|
| Inventive Example 1 | Polymer 1 | 3.2 | 11001 | 8420 | 7530 | 265 |
| Inventive Example 2 | Polymer 2 | 4.2 | 7280 | 6070 | 5510 | 280 |
| Comparative example 1 | Polymer 4 | 2 | 13842 | 10767 | 9807 | 333 |

| Material | Vinyl/ 1000 C. | Vinylidene/ 1000 C. | Trans-vinylene/ 1000 C. | Total carbon-carbon double bonds/1000 C. |
|---|---|---|---|---|
| Example 1 | 0.87 | 0.19 | 0.09 | 1.15 |
| Example 2 | 0.77 | 0.18 | 0.08 | 1.03 |
| Comparative example 1 | 0.11 | 0.22 | 0.04 | 0.37 |

Processing Examples

The Effect of Melt Temperature to Rpm and Out Put

The data presented in FIG. 1 and FIG. 2 below show that the Polymer Composition of the invention (examples 1, 2 and 3) with higher MFR and higher C—C double bond content (compared to the corresponding reference materials) has improved processing conditions indicated as a function of melt temperature vs rpm and, respectively, out-put, compared to reference examples 1 having lower MFR and lower C—C content, when extruded in the same process conditions given below.

The results on the melt temperature vs rpm for Example 1 and Example 2 compared with Comparative example 1 are presented in FIG. 1. FIG. 1 shows that both Inventive Examples result in a lower melt temperature at each tested rpm. The results on melt temperature vs out put are presented in FIG. 2 for Example 1, Example 2 and Comparative example 1. FIG. 2 shows that the Inventive examples both results in a lower melt temperature for a certain out put.

Figure 2:
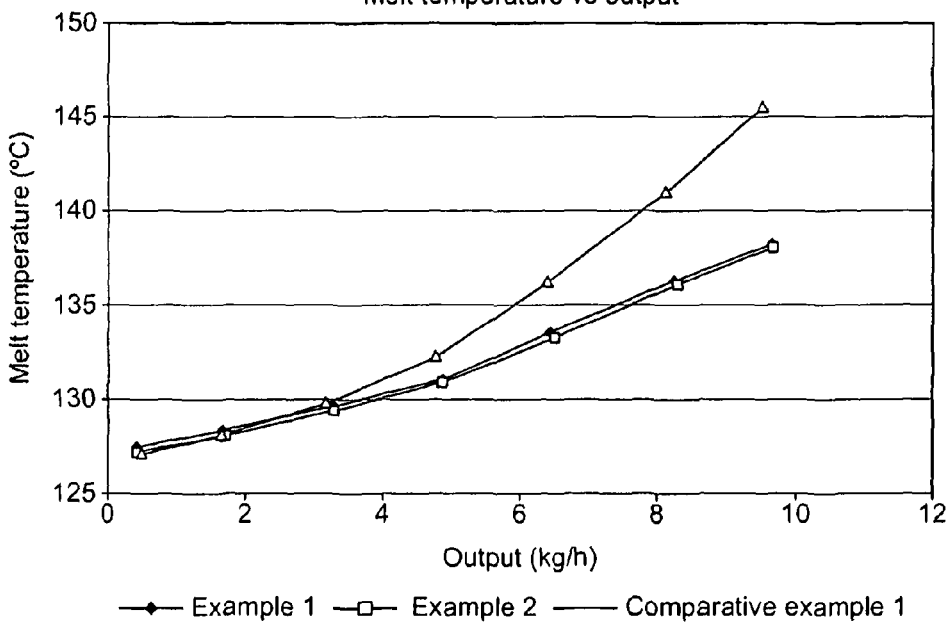

The data presented in both FIG. 1 and FIG. 2 are both desired to obtain good extrusion properties. This can be utilised to either to have the same out put but benefit from the lower melt temperature or that a higher out put is obtained for a specific melt temperature.

In the crosslinking experiments presented the amount of peroxide has been adjusted to result in the same hot set value (e.g in the range of 50-60% hot set elongation) on a fully crosslinked plaque. The results from hot set, elatograph and Monsanto scorch measurements are summarised in Table 3.

TABLE 3

Polymers 1 and 2 are Polymers 1 and 2 of Inventive Examples 1 and 2

| Composition | Hot set elongation (%) | Permanent deformation (%) | Elastograph value (Nm) at 180° C. | T10 (min) at 180° C. | T90 (min) at 180° C. | Monsanto scorch value (min) |
|---|---|---|---|---|---|---|
| Polymer 1 + 0.75 wt % DCP | 50% | 1.2% | 0.71 | 0.66 | 3.08 | 39.5 |
| Polymer 2 + 0.90 wt % DCP | 55% | 0.6% | 0.73 | 0.65 | 2.90 | 26.3 |
| Polymer 3 (Comparative example) + 2.2 wt % DCP | 50% | −1.5% | 0.71 | 0.67 | 2.94 | 28.3 |

DCP = dicumylperoxide (CAS number 80-43-3)

The results from the is summarised in the Table below:

| Material | Position 0 | Position 90 | Position 180 | Position 270 | Average thickness (mm) | Centricity |
|---|---|---|---|---|---|---|
| Inv. Example 1 + 0.75 wt % DCP | 9.18 | 8.95 | 8.06 | 8.03 | 8.56 | 13.4% |
| Inv. Example 2 + 0.90 wt % DCP | 8.58 | 10.25 | 9.09 | 8.18 | 9.03 | 22.9% |
| Comparative example 1 + 2 wt % DCP | 8.63 | 9.52 | 8.80 | 8.28 | 8.81 | 14.1% |
| LE4201 | 8.0 | 8.6 | 9.5 | 8.8 | 8.73 | 17.2% |

Check how the data are presented and calculated.

Figure 3:
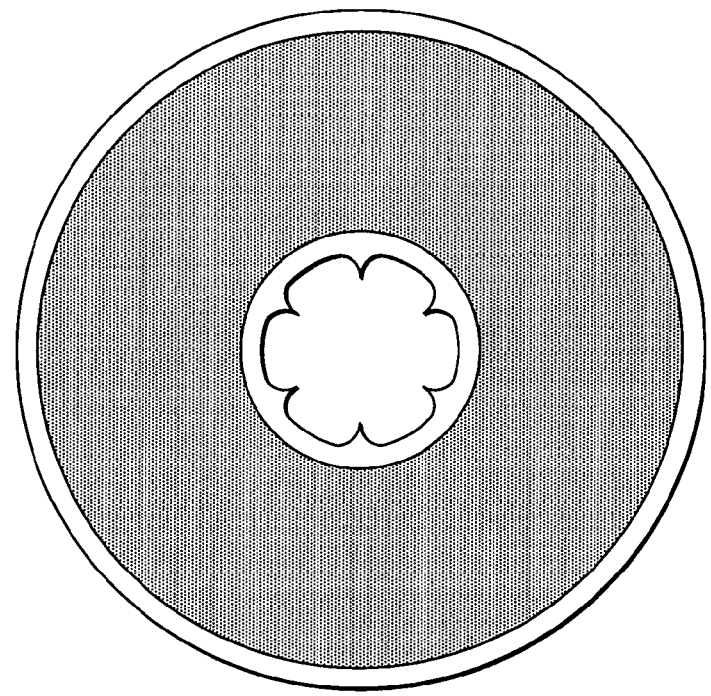
FIG. 3. Example of a cable core produced of a crosslinked Example 1 polymer.

FIG. 3. Example shows a cable core produced of a crosslinked Example 1 polymer.

Figure 4:
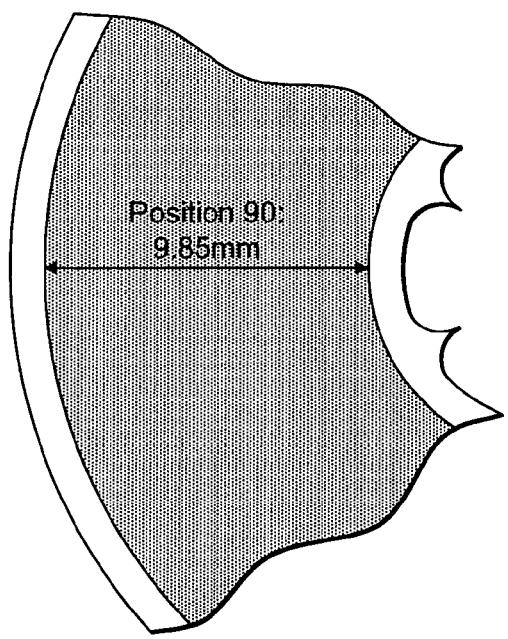
FIG. 4. Example of how the insulation thickness in 90° position was determined in a cable core produced of a crosslinked Example 1 polymer.

FIG. 4. Example of how the insulation thickness in 90° position was determined in a cable core produced of a crosslinked Example 1 polymer.

The invention claimed is:

1. A polymer composition comprising
A) at least one unsaturated polymer which is an LDPE copolymer of ethylene with one or more polyunsaturated comonomers only, said polyunsaturated comonomers having a straight carbon chain with at least 8 carbon atoms and at least 4 carbon atoms between non-conjugated double bonds, wherein at least one double bond is terminal, and
B) optionally a crosslinking agent,
wherein the polymer composition has
a) a melt flow rate, $MFR_2$, of at least 2.8 g/10 min, and
b) contains carbon-carbon double bonds in an amount of at least 0.40 carbon-carbon double bonds/1000 carbon atoms.

2. The polymer composition of claim 1, wherein the polymer composition contains said b) carbon-carbon double bonds in an amount of less than 5.0/1000 carbon atoms.

3. The polymer composition according to claim 1, wherein said b) carbon-carbon double bonds include vinyl groups originating from a i) polyunsaturated comonomer, from a ii) chain transfer agent, from an iii) unsaturated low molecular weight compound, preferably a crosslinking booster or a scorch retarder, or from iv) any mixture of (i) to (iii).

4. The polymer composition according to claim 1, wherein said b) carbon-carbon double bonds present in the polymer composition include vinyl groups originating from said at least one diene.

5. The polymer composition according to claim 1, wherein the at least one unsaturated polymer (A) has
a) a melt flow rate, $MFR_2$, of at least 3.0 g/10 min, and wherein said at least one unsaturated polymer (A) contains
b) carbon-carbon double bonds in an amount of at least 0.40 carbon-carbon double bonds/1000 carbon atoms.

6. The polymer composition according to claim 1, wherein the b) carbon-carbon double bonds present in the at least one unsaturated polymer (A) include vinyl groups which originate from i) a polyunsaturated comonomer, from a ii) chain transfer agent, or from iii) any mixture thereof, and wherein said A) unsaturated polymer contains b) said vinyl groups in a total amount of at least 0.30/1000 carbon atoms.

7. The polymer composition according to claim 1, wherein the polyunsaturated comonomer is a $C_8$ to $C_{14}$ non-conjugated diene.

8. The polymer composition according to claim 1, wherein the Polymer Composition has an a) $MFR_2$ of at least 3.0 g/10 min when determined using ISO 1133, under 2.16 kg load
and/or
a viscosity, $\eta_{0.05}$, of at least 3000 Pas.

9. The polymer composition according to claim 1, wherein the unsaturated LDPE copolymer has an a) $MFR_2$ of at least 3.2 g/10 min, when determined according to ISO 1133, under 2.16 kg load
and/or
has a viscosity, $\eta_{0.05}$, of at least 3500 Pas.

10. The polymer composition according to claim 1 which is crosslinkable and comprises said crosslinking agent (B) which is a peroxide.

11. An article comprising a polymer composition according to claim 1 which comprises at least one unsaturated polymer (A) which is crosslinkable.

12. The article according to claim 11, wherein the article is a cable comprising a conductor surrounded by one or more layers, wherein at least one layer of said layers comprises a polymer composition.

13. The article according to claim 12, wherein the cable is a power cable comprising a conductor surrounded by at least an inner semiconductive layer, an insulation layer and an outer semiconductive layer, in the given order, wherein at least the insulation layer comprises the polymer composition.

14. A process for producing a cable, the process comprising the steps of a) applying on a conductor one or more layers of the polymer composition of claim 1.

15. The process according to claim 14, comprising a further step of b) crosslinking the at least one cable layer obtained from step a) comprising a crosslinkable unsaturated polymer (A) of the polymer composition, wherein the crosslinking is effected in the presence of a crosslinking agent.

16. A crosslinked cable comprising a conductor surrounded by one or more layers, wherein at least one layer of said layers comprises the polymer composition obtainable by the process of claim 14, wherein said A) at least one unsaturated polymer is crosslinked.

17. A crosslinked cable comprising a conductor surrounded by one or more layers, wherein at least one layer of said layers comprises the polymer composition according to claim 1, wherein said A) at least one unsaturated polymer is crosslinked.

18. The polymer composition of claim 1, wherein the polyunsaturated comonomer is selected from the group consisting of 1,7-octadiene, 1,9-decadiene, 1,11-dodecadiene, 1,13-tetradecadiene, and mixtures thereof.

* * * * *